US010527295B2

(12) United States Patent
Lewis

(10) Patent No.: US 10,527,295 B2
(45) Date of Patent: Jan. 7, 2020

(54) HYDRONIC BOILER CONTROL SYSTEM WITH WEATHER ANTICIPATION

(71) Applicant: IoT Cloud Technologies Inc., Calgary (CA)

(72) Inventor: Matthew James Lewis, Calgary (CA)

(73) Assignee: IoT Cloud Technologies Inc., Calgary (CA)

(*) Notice: Subject to any disclaimer, the term of this patent is extended or adjusted under 35 U.S.C. 154(b) by 0 days.

(21) Appl. No.: 15/435,562

(22) Filed: Feb. 17, 2017

(65) Prior Publication Data
US 2018/0058704 A1    Mar. 1, 2018

Related U.S. Application Data

(60) Provisional application No. 62/378,804, filed on Aug. 24, 2016.

(51) Int. Cl.
| F24D 19/10 | (2006.01) |
| F24D 3/00 | (2006.01) |
| G05D 23/19 | (2006.01) |

(52) U.S. Cl.
CPC ........... *F24D 19/1009* (2013.01); *F24D 3/00* (2013.01); *G05D 23/1934* (2013.01); *F24D 2220/042* (2013.01)

(58) Field of Classification Search
CPC .. F24D 19/1009; F24D 3/00; F24D 2220/042; G05D 23/1934; F23N 1/08; F23N 1/082
(Continued)

(56) References Cited

U.S. PATENT DOCUMENTS 5,125,572 A * 6/1992 Piegari ................ F24D 19/1009
236/91 E
5,294,051 A * 3/1994 Piegari ............... G05D 23/1917
236/91 E
(Continued)

FOREIGN PATENT DOCUMENTS

| EP | 980034 | 2/2000 |
| JP | 2016145698 A * | 8/2016 |
| JP | 2017035222 A * | 2/2017 |

OTHER PUBLICATIONS

"Vulcain 301C_UM_Bilingual 2007-04.pdf", Model VA-301C User's Manual, Apr. 2007.*
(Continued)

*Primary Examiner* — Gregory L Huson
*Assistant Examiner* — Daniel E Namay
(74) *Attorney, Agent, or Firm* — Kyle R Satterthwaite; Ryan W Dupuis; Ade & Company Inc.

(57) ABSTRACT

A microcomputer-based controller has control outputs operably connected to a hydronic boiler of a building, a network connection for receiving weather forecast information from a meteorological server, and an input operably connected to an outside temperature transducer. The controller is configured to an appropriate set-point temperature for the boiler based on both the current outside temperature and a forecasted outdoor temperature from the meteorological server. Remote zone temperature sensors report zone temperatures to the controller, based on which further adjustment of the set point temperature are made if a notable number of zones all have temperatures notably shifted in a same direction from a normally expected zone temperature. The zone temperature sensors and controller are connected as nodes in a mesh network.

23 Claims, 3 Drawing Sheets

(58) Field of Classification Search
USPC .................. 237/8 A; 236/1 B, 20 R, 51, 94
See application file for complete search history.

(56) References Cited

U.S. PATENT DOCUMENTS

| | | | | |
|---|---|---|---|---|
| 5,479,358 | A * | 12/1995 | Shimoda | G05D 23/1902 307/126 |
| 5,779,143 | A * | 7/1998 | Michaud | F24D 19/1009 237/56 |
| 6,098,893 | A * | 8/2000 | Berglund | G05D 23/1917 236/51 |
| 7,658,335 | B2 * | 2/2010 | Johnson, Jr. | F24D 12/02 122/448.3 |
| 8,490,886 | B2 * | 7/2013 | Cohen | F24D 19/1009 122/4 R |
| 8,798,796 | B2 * | 8/2014 | Grohman | G05D 27/02 700/276 |
| 8,843,239 | B2 * | 9/2014 | Mighdoll | G05D 23/1902 700/277 |
| 8,844,834 | B1 * | 9/2014 | Lyons | G05D 23/1919 236/14 |
| 8,851,393 | B1 | 10/2014 | Girgis | |
| 9,004,370 | B2 * | 4/2015 | Cohen | F24D 19/1009 237/12 |
| 9,279,590 | B2 * | 3/2016 | Bohan | F24D 3/00 |
| 9,279,595 | B2 * | 3/2016 | Mighdoll | G05D 23/1902 |
| 9,568,201 | B2 * | 2/2017 | Fadell | G05D 23/1905 |
| 9,715,261 | B2 * | 7/2017 | Wilkins | G06F 1/26 |
| 9,851,111 | B1 * | 12/2017 | Lyons | F24D 19/1009 |
| 9,964,316 | B2 * | 5/2018 | Deivasigamani | F24H 9/2007 |
| 10,142,421 | B2 * | 11/2018 | Mighdoll | G05D 23/1902 |
| 2004/0124638 | A1 * | 7/2004 | van de Loo | H02P 9/04 290/40 C |
| 2008/0179415 | A1 * | 7/2008 | Johnson | F24D 12/02 237/8 A |
| 2008/0179416 | A1 * | 7/2008 | Johnson | F01K 17/02 237/8 A |
| 2009/0001186 | A1 * | 1/2009 | Cohen | F24D 19/1009 237/8 A |
| 2009/0050703 | A1 | 2/2009 | Lifson et al. | |
| 2011/0046792 | A1 * | 2/2011 | Imes | F24F 11/63 700/278 |
| 2012/0217315 | A1 * | 8/2012 | Witbeck | G05D 23/1934 236/51 |
| 2012/0259470 | A1 | 10/2012 | Nijhawan et al. | |
| 2013/0048745 | A1 * | 2/2013 | Johnson, Jr. | F22B 35/00 237/8 A |
| 2013/0133404 | A1 | 5/2013 | Patel et al. | |
| 2013/0277440 | A1 * | 10/2013 | Cohen | F24D 19/1009 237/8 A |
| 2014/0048244 | A1 * | 2/2014 | Wallace | F28F 27/00 165/253 |
| 2014/0058567 | A1 * | 2/2014 | Matsuoka | G05D 23/1917 700/276 |
| 2014/0058806 | A1 * | 2/2014 | Guenette | G05B 15/02 705/14.1 |
| 2014/0070014 | A1 * | 3/2014 | Bohan | F24D 3/00 237/8 A |
| 2014/0230925 | A1 * | 8/2014 | Halimi | G05D 16/20 137/487.5 |
| 2014/0316585 | A1 * | 10/2014 | Boesveld | G05D 23/1902 700/278 |
| 2015/0057814 | A1 * | 2/2015 | Mighdoll | G05D 23/1902 700/278 |
| 2015/0108230 | A1 * | 4/2015 | Cloonan | F24D 19/1009 236/1 B |
| 2015/0134124 | A1 | 5/2015 | Carter et al. | |
| 2015/0145677 | A1 | 5/2015 | Smith, Jr. | |
| 2015/0159893 | A1 | 6/2015 | Daubman et al. | |
| 2015/0276238 | A1 * | 10/2015 | Matsuoka | G05B 15/02 700/278 |
| 2015/0276239 | A1 * | 10/2015 | Fadell | G05D 23/1905 237/2 A |
| 2015/0316907 | A1 * | 11/2015 | Elbsat | G06Q 10/04 700/275 |
| 2016/0119430 | A1 * | 4/2016 | Mighdoll | G05D 23/1902 709/225 |
| 2016/0169539 | A1 * | 6/2016 | Deivasigamani | F24H 9/2007 237/12 |
| 2016/0187894 | A1 * | 6/2016 | Malky | F24D 3/02 700/276 |
| 2016/0232549 | A1 * | 8/2016 | Guenette | G06Q 50/06 |
| 2016/0280040 | A1 * | 9/2016 | Connell | B60H 1/00771 |
| 2016/0290660 | A1 * | 10/2016 | O'Hayer | F24D 19/10 |
| 2017/0097161 | A1 * | 4/2017 | Hoffman | F24D 19/1003 |
| 2017/0138624 | A1 * | 5/2017 | Kriz | F24D 19/1081 |
| 2017/0176038 | A1 * | 6/2017 | Munier | H04W 4/029 |
| 2017/0209341 | A1 * | 7/2017 | Potucek | A61H 33/0087 |
| 2017/0278039 | A1 * | 9/2017 | Saito | G06Q 50/06 |
| 2017/0343227 | A1 * | 11/2017 | Mowris | F24F 11/63 |
| 2018/0034273 | A1 * | 2/2018 | Imai | G06Q 50/06 |
| 2018/0058704 | A1 * | 3/2018 | Lewis | F24D 19/1009 |
| 2018/0148389 | A1 * | 5/2018 | Wang | F22B 1/1861 |
| 2018/0252417 | A1 * | 9/2018 | Komatsu | H02J 3/00 |

OTHER PUBLICATIONS

"HA_Vulcain301W Brochure 2006-09.pdf", Model VA-301W Data Sheet, Sep. 2006.*
Honeywell, "The Smart Choice is Honeywell", Outdoor Reset Controls, catalog, 50-1352 PM, Oct. 2009, (2 pages) www.forwardthinking.honeywell.com.
Honeywell, "Aquatrol Electronic Controls for Hydronic Heating", catalog, 63-9686 PR Jan. 2010, (12 pages) www.honeywell.com.
Honeywell, "Sola Hydronic Control", catalog, 63-9725 PR, Nov. 2010, (8 pages) www.honeywell.com.
Cooperman, Alissa; Dieckmann, John and Brodrick, James, "Using Weather Data for Predictive Control", article, ASHRAE Journal, Dec. 2010, American Society of Heating Refrigerating and Air Conditioning Engineers, Inc., www.ashrae.org.
Friedrich, Uwe, "Projektinfo 14/2011 Detailed Information on Energy Research", brochure, BINE Information Service, kontakt@bine.info; www.bine.info.
O'Boyle, Britta, "Tado Smart Thermostat Review", article, Aug. 8, 2014, www.picket-line.com/review/129799-tado-smart-thermostat-review.
White-Rodgers, Indoor-Outdoor Hot Water Temperature Control with Adjustable Reset Ratio Installation Instructions, Part No. 37-1640B.

* cited by examiner

HYDRONIC BOILER CONTROL SYSTEM WITH WEATHER ANTICIPATION

CROSS REFERENCE TO RELATED APPLICATIONS

This application claims benefit under 35 U.S.C. 119(e) of Provisional Application Ser. No. 62/378,804, filed Aug. 24, 2016, the entirety of which is incorporated herein by reference.

BACKGROUND

Existing indoor outdoor two temperature control systems designed for use on hydronic boilers provide an automatically adjusted temperature set point based on outdoor temperature and hydronic boiler temperature. As the outdoor temperature drops the hydronic boiler temperature set point is raised. As the outside gets warmer the hydronic boiler temperature set point is lowered. In some installations the hydronic boiler is automatically switched off when the outside temperature reaches a pre-set temperature. The hydronic boiler is automatically switched back on when the outside temperature drops below the pre-set temperature.

The two temperature indoor-outdoor control system cannot anticipate changes in outdoor weather conditions and therefore cannot react in advance to sudden increases in outdoor temperature, resulting in overheating and wasted energy.

SUMMARY OF INVENTION

According to one aspect of the invention, there is provided a computer implemented method of controlling operation of a hydronic boiler, said method comprising automatically obtaining a current outdoor air temperature, automatically obtaining meteorological forecast data through one or more internet servers, automatically assigning a set point temperature of the hydronic boiler based on both the current outdoor air temperature and the meteorological forecast data, and operating the boiler according to said assigned set point temperature.

According to another aspect of the invention, there is provided a hydronic heating system comprising:
a hydronic boiler used to heat a building,
a microcomputer-based controller coupled to said hydronic boiler,
an internet connection coupled to said microcomputer-based controller,
one or more internet based meteorological HTTP web servers that provide weather forecast information,
a hydronic boiler temperature transducer connected to said microcomputer-based controller, and
an outside temperature transducer connected to said microcomputer-based controller,
wherein said microcomputer-based controller is configured to determine a set-point temperature for the boiler based on both a current outside temperature and the weather forecast information, and to operate the boiler according to said set point temperature.

According to yet another aspect of the invention, there is provided a hydronic heating control system comprising a microcomputer-based controller having control outputs operably connectable to a hydronic boiler of a building to control operation thereof, a network connection operably connectable to the internet to receive weather forecast information from a meteorological server, and an input operably connectable to an outside temperature transducer, wherein said microcomputer-based controller is configured to assign a set-point temperature for the boiler based on both a current outside temperature and the weather forecast information, and operate the boiler according to said assigned set point temperature.

According to a further aspect of the invention, there is provided a hydronic heating system comprising a hydronic boiler used to heat a building, a controller coupled to said hydronic boiler, and a plurality of zone temperature sensors that communicate with said microcomputer-based controller, wherein said zone temperature sensors are configured to measure respective zone temperatures and provide said measured zone temperatures to said microcomputer-based controller, which is configured to adjust a set point temperature of the hydronic boiler based on said current remote zone temperatures.

Preferably, the controller is configured to adjust the set point temperature of the boiler based on the measured remote zone temperatures by determining whether a quantity of remote zone temperature sensors exceeding a zone quantity threshold have respective zone temperatures that vary from a normal zone temperature value by more than a zone temperature variation threshold, and in response to determination that the zone quantity threshold and zone temperature variation threshold are exceeded, adjust the set-point temperature of the boiler.

In another embodiment, the present invention comprises a weather anticipating hydronic boiler control system with one hydronic boiler, one system controller used to control the operation on said hydronic boiler based on a ratio between current outside air temperature offset by the meteorological forecast data obtained through the Internet and the hydronic boiler temperature. Software updates, current control parameters, temperature data and settings of said system controller are transmitted to and received from internet based cloud servers through encrypted networks.

In another embodiment, the present invention comprises a weather anticipating hydronic boiler control system with several hydronic boilers, one system controller used to control the operation of each said hydronic boiler based on a ratio between current outside air temperature offset by the meteorological forecast data obtained through the Internet and the hydronic boiler temperatures. Software updates, current control parameters, temperature data and settings of said system controllers are exchanged between said system controllers and transmitted to and received from internet based cloud servers through encrypted networks.

In another embodiment, the present invention comprises a weather anticipating hydronic boiler control system with one hydronic boiler, one system controller used to control the operation on said hydronic boiler based on a ratio between current outside air temperature offset by the meteorological forecast data obtained through the internet, current remote zone air temperatures and the hydronic boiler temperature. Software updates, current control parameters, temperature data and settings of said system controller are transmitted to and received from internet based cloud servers through encrypted networks.

In another embodiment, the present invention comprises a weather anticipating hydronic boiler control system with several hydronic boilers, one system controller used to control the operation of each said hydronic boiler based on a ratio between current outside air temperature offset by the meteorological forecast data obtained through the internet, current remote zone air temperatures and the hydronic boiler temperatures. Software updates, current control parameters, temperature data and settings of said system controllers are exchanged between said system controllers and transmitted to and received from Internet based cloud servers through encrypted networks.

In another embodiment, the present invention comprises a weather anticipating hydronic boiler control system with one hydronic boiler, one system controller used to control the operation on said hydronic boiler based on a ratio between current outside air temperature offset by the meteorological forecast data obtained through the internet, current remote zone air temperatures, current remote zone hydronic heater temperatures, and the hydronic boiler temperature. Software updates, current control parameters, temperature data and settings of said system controller are transmitted to and received from internet based cloud servers through encrypted networks.

In another embodiment, the present invention comprises a weather anticipating hydronic boiler control system with several hydronic boilers, one system controller used to control the operation of each said hydronic boiler based on a ratio between current outside air temperature offset by the meteorological forecast data obtained through the internet, current remote zone air temperatures, current remote zone hydronic heater temperatures and the hydronic boiler temperatures. Software updates, current control parameters, temperature data and settings of said system controllers are exchanged between said system controllers and transmitted to and received from internet based cloud servers through encrypted networks.

DESCRIPTION OF DRAWINGS

Preferred embodiments of the invention will now be described in conjunction with the accompanying drawings in which.

DESCRIPTION

The hydronic boiler control system disclosed herein uses weather forecast data obtained from meteorological cloud servers to react in advance of changes in outdoor weather conditions. The hydronic boiler control system connects to the internet to obtain current meteorological data and meteorological forecast data for the location of the building heated by the boiler, and then uses the current meteorological data and meteorological forecast data to control the hydronic boiler temperature set point. By using the current and forecast meteorological data, the system reacts in advance of outdoor weather conditions. By reacting in advance of outdoor weather conditions, the system avoids over-heating and reduces energy consumption in buildings with hydronic boilers.

Figure 1:
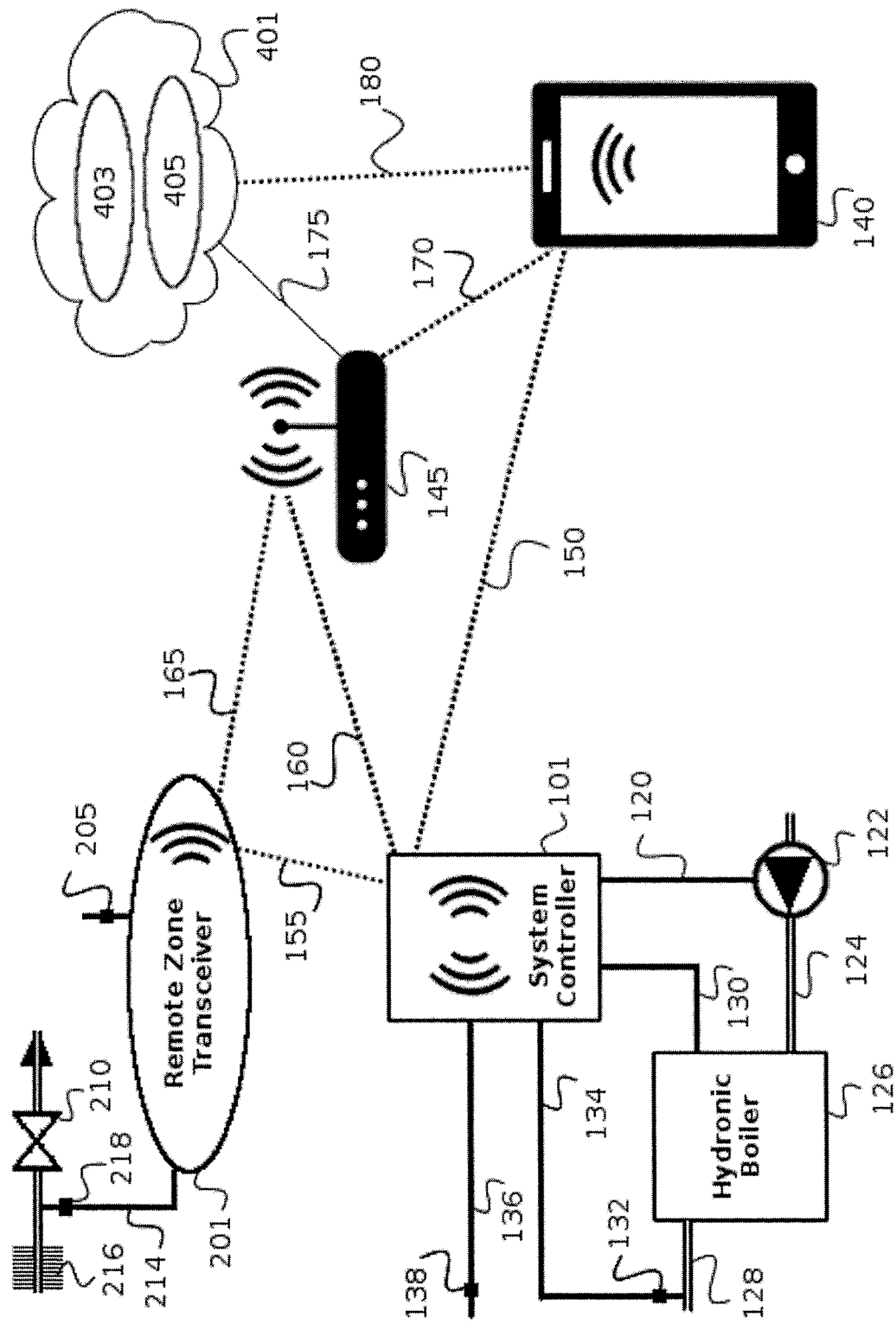
FIG. 1 is a simplified schematic diagram of a hydronic boiler control system according to a first embodiment of the present invention.

FIG. 1 illustrates a hydronic heating system that includes a boiler 126 for heating water that is circulated in order to heat a building. The boiler may be a non-condensing type boiler or condensing type boiler. Water is pumped through the boiler return line 124 by the circulation pump 122. The boiler operation is controlled by the system controller 101 through connector 130. Boiler alarm signals are also sent to the system controller 101 through connector 130. The system controller 101 monitors the boiler discharge 128 temperature with direct to digital temperature transducer 132. Direct to digital temperature transducer 132 is connected to the system controller 101 through connector 134. Outside air temperature at the building location is monitored locally by a direct to digital temperature transducer 138 that is connected to the system controller 101 through connector 136. Hydronic boiler circulation pump 122 is connected to the system controller 101 through auxiliary connector 120. The system controller 101 communicates with other devices and servers through wireless connections 150, 160, 155, for example using any of the various Wi-Fi IEEE 802.11 and or ZigBee IEEE 802.15.4 wireless.

The system controller 101 interfaces with multiple optional analog and digital inputs and outputs through the auxiliary interface connector 120. The system controller comprises a microcomputer with a processor and non-transitory computer readable memory coupled thereto, on which there are stored statements and instructions executable by the processor perform the functions, operations, calculations and other steps described herein. Particular software code and algorithms for performing the described steps will be within the purview of the person of ordinary skill in the art upon a reading of the generally described steps outlined herein.

In the present embodiment, the analog and digital inputs and outputs of the auxiliary interface include 0-10 VDC signal, 4-20 mA signal, RS485, NC and NO dry contacts. The system controller's auxiliary interface is software programmable and designed to provide a hardware interface with pumps, control valves, motor control centers (MCCs), variable frequency drives (VFDs), flow switches and transducers. The hydronic boiler circulation pump 122 is connected to the system controller 101 through an optional auxiliary interface connection 120. Such connections by which a computerized controller is interfaced with the components of a hydronic boiler are well known in the art, and thus not specifically described herein in greater detail.

Remote zone temperature transceiver 201 monitors the zone air temperature at a particular zone of the building through direct to digital temperature transducer 205, and also monitors the hydronic heater temperature through direct to digital temperature transducer 218. The hydronic direct to digital temperature transducer 218 is connected to the remote zone temperature transceiver 201 through connector 214 and monitors the heater temperature at a location between the hydronic heater 216 and hydronic heater zone control valve 210. Remote zone temperature transceiver 201 can also connect directly to the cloud servers through wireless connection 165. The transceiver 201 and connected transducers 205, 218 thereby collectively form a wireless zone temperature sensor for detecting zone air and heater temperatures and wirelessly reporting same to the controller 101. Remote zone temperature transceiver 201 integrates with additional remote zone temperature transceivers through a wireless mesh network by which these remote zone temperature sensors communicate with the system controller 101. Each zone temperature transceiver is located in a respective zone (e.g. room, apartment, or other discrete area) of the building.

The system controller 101 receives software updates, operational settings, current weather and weather forecast data from the cloud servers 401 through Wi-Fi access point 145. The cloud servers 401 include meteorological HTTP web servers 403 and client interface and system control servers 405. The client interface and system control servers 405 interface with the internet enabled devices 140, the system controller 101, the remote zone temperature transceiver 201, generate the email and or SMS text alarms, and acquire and process the weather forecast data from the meteorological HTTP web servers 403.

The Wi-Fi access point connects to the internet through 175. The connection from the Wi-Fi access point 145 to the internet 175 is made through, DSL modem, cable modem, optical fibre connection or cellular hot spot connection. The client interface and system control servers 405 may be operated separately and independently of the meteorological server(s) by an administrative entity responsible for the operation of the overall boiler control system, with the updates, operational settings, and other administrative communications thus coming from the client interface and system control servers 405 in a manner separate and independent from the meteorological data coming from an independent source, such as a previously existing meteorological service. Retrieving the meteorological data from existing third party meteorological HTTP web servers 403 provides the system with universality, allowing it to operate in any geographic region within which meteorological data is measured and posted online on publicly accessible web pages. No specialized communication protocols are required to interact with government weather bureaus or other non-HTTP resources.

Building owners, property managers or other authorized personnel, hereafter referred to generally as users, can access the control system 101 and cloud servers 401 through internet enabled devices 140. The internet enabled devices 140 include, cell phones, tablets, laptops or desktop computers. Internet enabled devices connect to the system controller through wireless connection 150 or through wireless connection 170 to Wi-Fi access point 145 to wireless connection 160. The internet enabled devices also connect through the Wi-Fi access point 145 or directly to the internet through connection 180 to the cloud servers 401. Connections through the internet are encrypted using Transport Layer Security (TLS) cryptographic protocol. Users login through an encrypted porthole to access the systems. Once logged in the users can monitor the operation, historical data and charts, change settings and configurations through internet enabled devices 140. Various levels of system access are assigned to different users. Alarms are automatically sent to users by email and or SMS text messages.

As outlined in the background section above, conventional boiler control operate on the two-temperature basis, where for a given outdoor air temperature, the boiler is operated at a prescribed set point temperature. In the present invention, the boiler set point temperature is selected based not only on the current outdoor temperature, but also an anticipated outdoor temperature acquired as part of, or the entirety of, the weather forecast data retrieved from the meteorological cloud servers. So, for example, at given point in time, i.e. the current time $t_0$, the controller measures the current outdoor temperature $T_C$ and acquires the anticipated outdoor temperature $T_A$ at a future time $t_f$ of predetermined interval from the current time.

In the event that the anticipated temperature $T_A$ is warmer than the current temperature $T_C$, the controller assigns a boiler set point temperature that is lower than it would assign if the current and forecasted temperatures were equal. So, rather than setting the set point temperature to a normal default value for the given current outdoor temperature, it instead offsets the normal default set point value to a lower value, which is then used as the currently assigned boiler set point. On the other hand, in the present embodiment, if the forecasted temperature is colder than the current temperature, the controller instead uses the normal default set-point temperature. In other words, the controller performs no offset of the set point boiler temperature in the event of a colder forecast temperature. This way, the controller only ever offsets the set point temperature to a lower value than the default, thereby resulting in an energy savings by not generating boiler heat unnecessarily when a forecasted increase in ambient air temperature is expected.

Figure 3:
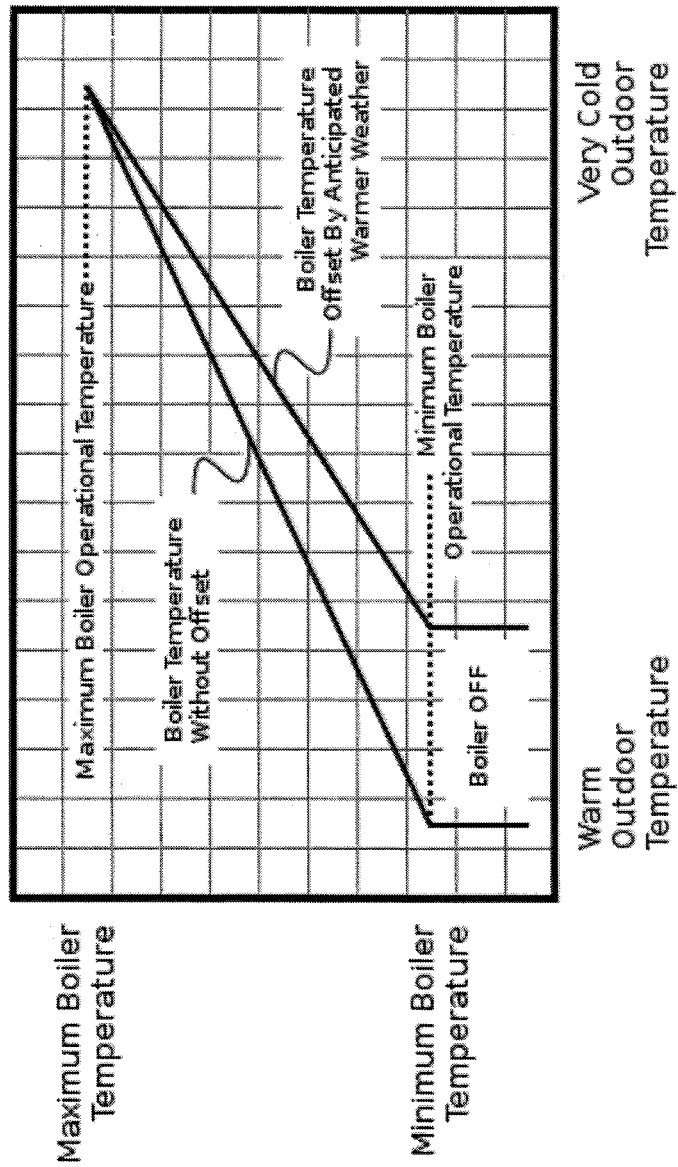
FIG. 3 illustrates a relationship between a current outdoor temperature, anticipated outdoor temperature and hydronic boiler temperature during operation of the system of FIG. 1 or 2 at a time when warmer weather is anticipated by a meteorological forecast.

FIG. 3 Illustrates the relationship between the outdoor temperature, anticipated outdoor temperature and the hydronic boiler set point temperature. As the outdoor temperature drops, the set-point temperature of the hydronic boiler is raised. As the outdoor temperature gets warmer, the hydronic boiler temperature is lowered. In the FIG. 3 scenario, the weather forecast predicts that it will be getting warmer as time goes on, and so the system offsets the hydronic boiler set point temperature to a lower value than it otherwise would in anticipation of the warmer outdoor temperature. As part of installation and configuration, the minimum and maximum temperature range of the hydronic boiler is programmed into the system.

So for a given current outdoor temperature, the controller would normally assign a corresponding default set point temperature to the boiler operation, unless the anticipated outdoor temperature is higher than the current temperature. Only in this situation will the controller offset the default set point temperature to a lower set point value. If the anticipated outdoor temperature is lower than the current temperature, the controller will not offset the set point temperature, and will instead use the default set point value. Likewise if the anticipated outdoor temperature is equal to the current temperature, the controller will simply assign the default set point value without any offset.

In the event that a network problem prevents communication of the controller with the cloud servers, the controller will revert to a normal two-temperature control scenario and assign the default set point for a given value of the currently detected temperature. Accordingly, the system provides a failsafe mode of operation to ensured continued heating of the building despite any network downtime or other communication failures. In failsafe mode, with no access to the current outdoor air temperature from the cloud servers, the controller instead relies solely on the current outdoor temperature measured by the local outside air sensor 138.

During normal operation (i.e. outside the failsafe mode), optimal accuracy is achieved by having the controller compare the current air temperature value obtained from the meteorological cloud server to the current air temperature value measured by the local outside air sensor 138. So long as any discrepancy between these values doesn't exceed a predetermined error threshold, the controller may default to use of either the locally measured current outdoor air temperature value or the higher of the two current outdoor air temperature values. If the error threshold is exceeded, then the controller can either use the current air temperature from the meteorological server (e.g. on the presumption that the discrepancy is caused by a faulty reading from the local sensor), or use an approximated current air temperature of intermediate value between the two (e.g. an average thereof). In either case, preferably the controller sends an alarm signal to the cloud servers and/or to users, for example by email or SMS text message. This way, the cause of the discrepancy (e.g. faulty sensor) can be investigated and corrected.

In the event that the two current outdoor air temperature values don't differ from one another by an amount exceeding the error threshold, the controller may use the higher of the two values by default, thus resulting in assignment of a lower boiler set point temperature than of the lower air temperature value was used, thereby tending toward more energy efficient operation by default by avoiding unnecessary heating based on a flawed outdoor air temperature of elevated value.

The zone air temperatures received from the remote zone transceivers are also monitored by the controller, and are used in adjusting the set point temperature of the boiler on an as-needed basis. In a multi-dwelling building such as an apartment or condominium complex, adjustment of the overall boiler system of the entire building based on fluctuation in only a single or small quantity of zones (e.g. one apartment, or one condominium) would be undesirable. For example, one occupant in a given apartment/condo may vary the air temperature of their apartment/condo relative to others by opening a window to cool the room. Raising of the set-point temperature of the overall boiler system in view of this single-zone temperature reduction would result in overheating of the other zones. Another occupant may be experiencing an elevated air temperature in their apartment/condo during use of a kitchen oven, for example, but lowering the set-point temperature of the overall boiler system in view of this single-zone temperature increase would result in under-heating of the other zones Accordingly, adjustment of the boiler set point by the controller is performed only if the number of zones reporting a notable variation from a normal or targeted air temperature exceeds a certain threshold. That is, if a substantial number of the total number of zones have fluctuated a notable mount in a same direction (hotter or colder) from the normal air temperature, only then is the boiler set point adjusted accordingly by the controller. So if a number of zones all have air temperatures that measured notably above or below the normal air temperature, and the quantity of zones experiencing this temperature shift exceeds a zone quantity threshold, the set point is adjusted. The set point is either raised if these air temperatures are below the normal air temperature value, or lowered if these air temperatures are above the normal air temperature value. Whether a "notable variation" in temperature has occurred may be based on whether the difference between the measured air temperature and the normal air temperature exceeds a predetermined value, i.e. a temperature variation threshold.

The same set-point adjustment process may be performed based on the zone heater temperatures, i.e. if the heater temperature has notably shifted from an expected normal value in same hotter/colder direction for a substantial majority of the zones, the boiler set point temperature is adjusted.

When the current outside temperature received by the controller from the outdoor air temperature sensor or meteorological server is below freezing, detection of a zone air temperature that is below a predetermined air temperature set point will cause the cloud server to send an alarm to the user(s), for example by way of email or SMS text message. The comparison of the detected temperature against the air temperature set point may be performed locally at the zone sensor, which then informs the cloud server to trigger the alarm, or the zone sensor may simply forward the detected temperature to the cloud server, directly or via the controller, and the server performs the comparison and triggers the alarm.

Additionally or alternatively, during such periods of below freezing outdoor temperatures confirmed by the system, detection of a zone heater temperature that is at or below the zone air temperature of the same zone sensor for longer than a threshold period of time will cause the cloud server to send an alarm to the user(s), for example by way of email or SMS text message. As outdoor temperature drops, the threshold period amount of time used to make this alarm determination is shortened. That is, a heater temperature found to be at or below the zone air temperature for a given number of minutes per hour is more concerning at very cold outdoor temperatures dramatically below freezing than at cool outdoor temperatures slightly below freezing. Accordingly, the threshold period for identifying an alarm situation is shortened as the below-freezing outdoor temperature decreases. Once again, the temperature comparison for detection of an alarm situation may be performed locally at the zone sensor, or remotely at the cloud server.

Another condition that generates an alarm is when the controller determines that the boiler is unable to maintain the appropriate set point boiler temperature, as confirmed by comparison of the measured boiler temperature from transducer 138 against the current set-point value.

Figure 2:
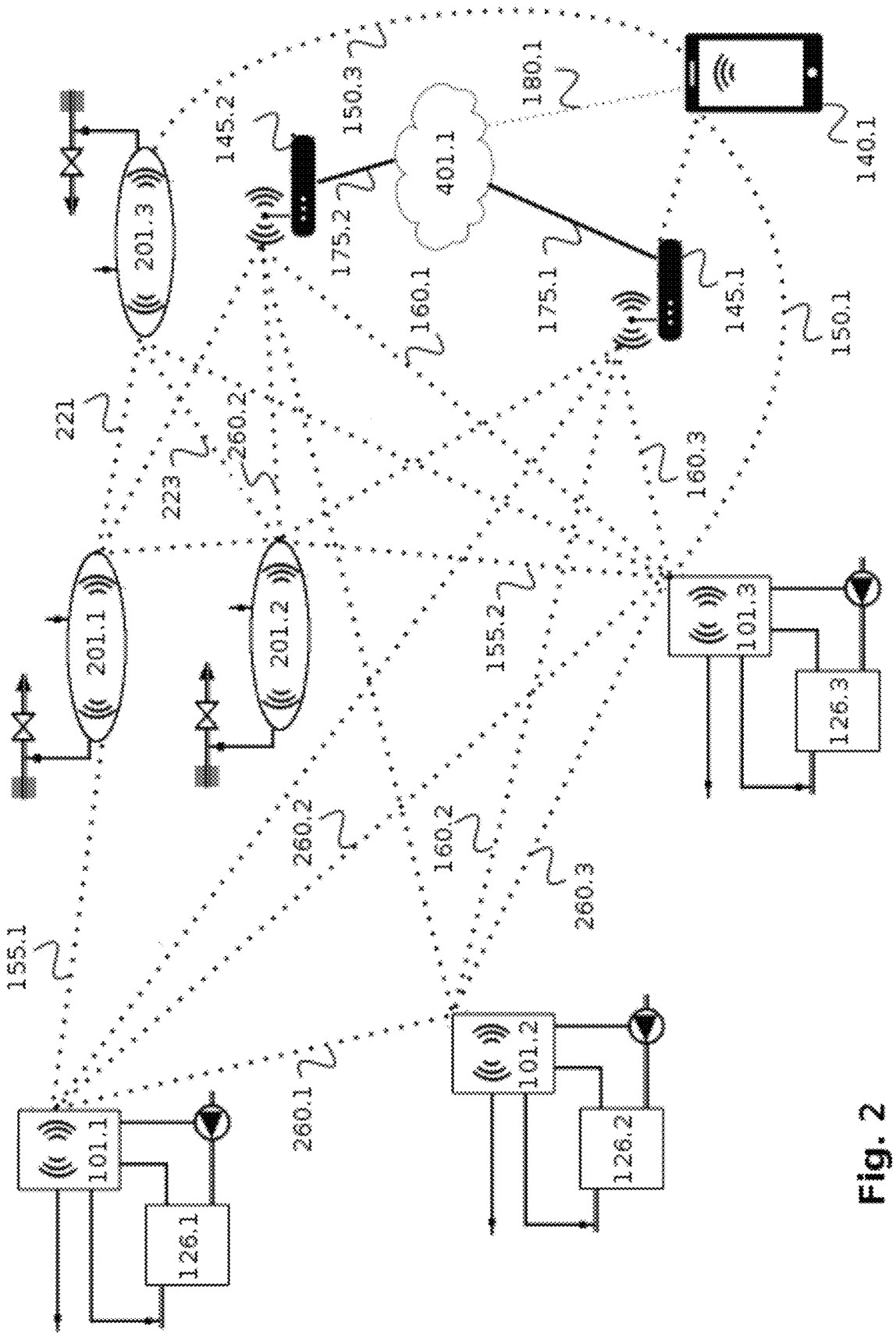
FIG. 2 is a simplified schematic diagram of a hydronic boiler control system according to a second embodiment of the present invention.

FIG. 2 illustrates a second embodiment of the invention, which demonstrates how the same general functionality of the first single-boiler embodiment can likewise be accomplished in a multi-boiler environment. This illustration shows three system controllers 101.1, 101.2, 101.3, three remote zone monitors 201.1, 201.2, 201.3 and two WiFi access points 145.1, 145.2. However, in any installation, the total number of system controllers is determined by the total number of boilers to be controlled at the location, and the total number of remote zone monitors depends on the amount of zones (e.g. apartments/condos/rooms) to be monitored. Furthermore the number of WiFi access points depends on the size of the building and range of the WiFi access points. As an example a building with four boilers would require four system controllers.

Each system controller 101.1, 101.2, 101.3 is directly connected to a respective boiler 126.1, 126.2, 126.3. The WiFi access points 145.1 and 145.2 are connect to the internet Cloud Servers 401.1 through cable, DSL or optical fiber connections 175.1, 175.2.

During installation and configuration of the system, the WiFi enabled device 140.1 connects to the system controllers through wireless connection 150.1 and the Remote Zone Monitors through wireless connection 150.3. During normal operation, the WiFi enabled device 140.1 connects to the Cloud Servers 401.1 through WiFi access point 145.1 or through a cellular internet connection 180.1.

System Controllers 101.1, 101.2, 101.3 communicate wirelessly locally through 260.1, 260.2, 260.3. System controllers 101.2 and 101.3 communicate wirelessly at connections 160.2, 160.3 through WiFi access point 145.1. Should system controllers 101.2 or 101.3 be unable to connect to WiFi access point 145.1 or if the signal strength WiFi access point 145.2 is higher, then the system controllers will automatically switch to WiFi access point 145.2, for example as shown via connection 160.1 between system controller 101.3 and WiFi access point 145.2.

Remote zone sensors 201.1, 201.2 communicate wirelessly locally with the system controllers 101.3, 101.1 through connections 155.1, 155.2. Remote zone sensors 201.1, 201.2 communicate wirelessly with the cloud servers 401.1 through WiFi access point 145.2. Should remote zone monitors 201.1, 201.2 be unable to connect to WiFi access point 145.2 or if the signal strength WiFi access point 145.1 is higher than that of access point 145.2, then the System Controllers will automatically switch to WiFi access point 145.1.

All the system controllers and remote zone monitors also operate as radio nodes in a mesh network topology. Remote zone sensors 201.3 communicates wirelessly through connection 221 or 223 and use remote zone sensors 201.1, 201.2 as radio nodes. Remote zone sensors 201.1, 201.2 radio nodes than connect wirelessly through connections 155.1, 155.2 to communicate with system controllers 101.1, 101.3.

By including a different respective controller for each and every boiler in the multi-boiler scenario, each boiler can operate autonomously of one another in the event of network connection issues or other complications. Additionally, each controller can optionally be configured to use input data acquired by another controller in the event it either fails to collect its own input data or detects an anomaly in its particular input data. For example, should a first system controller find a discrepancy between its locally measured outdoor air temperature and the meteorological server's current outdoor air temperature value an amount exceeding the error threshold, this controller may communicate with one or more of the other controllers to obtain their locally measured outdoor air temperature values, and optionally use this locally measured value from the other controller(s) for the set point determination process performed by the first controller experiencing the locally measured air temperature sensor anomaly.

Using internet enabled devices to remotely access the controller for monitoring of operating conditions and changing of settings and configurations, the controller in one embodiment lacks any on-board display screen or manual control inputs (buttons, switches) etc. Accordingly, no particular specialization of the controller is required for its use in the boiler-control context of the present invention, whereby an entirely generic microcomputer device can be used to minimize complexity and cost.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A computer-implemented method of controlling operation of a hydronic boiler, said method comprising:
providing a microcomputer-based controller (101) that is configured for communication with internet enabled devices (140) and remotely located servers (403, 405) via an internet connection (145), and is connected to a hydronic boiler direct-to-digital temperature transducer (132) for monitoring a temperature of the hydronic boiler and an outdoor direct-to-digital temperature transducer (138) for monitoring a local outdoor air temperature;
using said microcomputer-based controller (101):
automatically obtaining a current outdoor air temperature from the outdoor direct-to-digital temperature transducer (138),
automatically obtaining meteorological forecast data through from one or more internet based HTTP web servers (403) through said internet connection,
on an ongoing basis, automatically performing comparison of an anticipated outdoor air temperature from the meteorological forecast data against the current outdoor air temperature from the outdoor direct-to-digital temperature transducer (138), and
based on said comparison, automatically assigning a set point temperature of the hydronic boiler that is either a default set point value for the current outdoor air temperature if the comparison finds that the anticipated outdoor air temperature does not exceed the current outdoor air temperature, or a reduced set point value negatively offset from said default set point value if the comparison finds that the anticipated outdoor air temperature exceeds the current outdoor temperature,
in an instance of anticipated outdoor cooling, where the comparison finds that the anticipated outdoor air temperature is less than the current air temperature, operating the boiler according to the default set point value;
in a first instance of anticipated outdoor warming, where the comparison determines that the anticipated outdoor temperature exceeds the current outdoor temperature by a first amount, operating the boiler according to a first reduced set point that is negatively offset from the default set point value by a first offset value;
in a second instance of anticipated outdoor warming, where the comparison determines that the anticipated outdoor temperature exceeds the current outdoor temperature by a second amount that exceeds the first amount, operating the boiler according to a second reduced set point that is negatively offset from the default set point value by a second offset value whose magnitude exceeds the first offset value;
comparing the temperature of the hydronic boiler, as read by the hydronic boiler direct-to-digital temperature transducer, against the assigned set point temperature to obtain confirmation that said assigned set point temperature is reached and maintained by the boiler, and in the absence of said confirmation, to forward an alarm signal to a remotely located system control server (405) to trigger an alarm notification therefrom to one or more of the internet enabled devices (140), and
checking for communicability between the microcomputer-based controller and one or more of the remotely located servers via the internet connection, and in the event of failed communication therebetween, reverting to a failsafe mode of operation in which the microcomputer-based controller is operable to assign only default set point values, and not any reduced set point values negatively offset therefrom, and
using said remotely located system control server (405) to also check for communicability thereof with the microcomputer-based controller via the internet connection, and in the event of failed communication therebetween, trigger another alarm notification from the remotely located system control server to the one or more internet enabled devices.

2. The method of claim 1 comprising also using said microcomputer based controller (101) to obtain current remote zone temperatures from a plurality of remote zones, and adjust the set point temperature of the hydronic boiler based on said current remote zone temperatures.

3. The method of claim 2 wherein adjusting the set point temperature based on the current remote zone temperatures comprises determining whether a quantity of remote zones exceeding a zone quantity threshold have respective current remote zone temperatures that vary from a normal zone temperature value by more than a temperature variation threshold, and in response to determination that the zone quantity threshold and temperature variation threshold are both exceeded, adjusting the set-point temperature of the boiler.

4. The method of claim 3 wherein adjusting the set point temperature comprises determining that the zone quantity threshold is exceeded by a group of zones having zone temperatures that exceed the normal zone temperature value by more than the temperature variation threshold, and based thereon, reducing the set-point temperature of the boiler and operating the boiler according to said reduced set point temperature.

5. The method of claim 3 wherein adjusting the set point temperature comprises determining that the zone quantity threshold is exceeded by a group of zones having zone temperatures that are lesser than the normal zone temperature value by more than the air temperature variation threshold, and based thereon, increasing the set-point temperature of the boiler and operating the boiler according to said increased set point temperature.

6. The method of claim 2 wherein the remote zone temperature is a remote zone air temperature.

7. The method of claim 2 wherein the remote zone temperature is a remote zone heater temperature.

8. The method of claim 1 wherein the microcomputer-based controller lacks an onboard display and manual control inputs, and receives updates, operational settings and/or other administrative communication from the remotely located system control server and/or the one or more internet enabled devices.

9. A hydronic heating system comprising:
a hydronic boiler used to heat a building,
a microcomputer-based controller coupled to said hydronic boiler,
an internet connection coupled to said microcomputer-based controller to enable communication thereof with one or more internet enabled devices,
a remotely located system control server with which the microcomputer-based controller is communicable via said internet connection;
one or more meteorological internet based HTTP web servers that that provides weather forecast information,
a hydronic boiler direct-to-digital temperature transducer connected to said microcomputer-based controller, and
an outside direct-to-digital temperature transducer connected to said microcomputer-based controller,
wherein said microcomputer-based controller is configured to:
automatically obtain a current outdoor air temperature from the outside direct-to-digital temperature transducer,
automatically obtain an anticipated outdoor air temperature from the one or more meteorological internet based HTTP web servers via the internet connection,
on an ongoing basis, automatically perform comparison of the anticipated outdoor air temperature against a current outdoor air temperature obtained from the outside direct-to-digital temperature transducer, and based on said comparison, automatically assign a set point temperature of the hydronic boiler that is either a default set point value for the current outdoor air temperature if the comparison finds that the anticipated outdoor air temperature does not exceed the current outdoor air temperature, or a reduced set point value negatively offset from said default set point value if the comparison finds that the anticipated outdoor air temperature exceeds the current outdoor temperature,
in instances of anticipated outdoor cooling, where the comparison finds that the anticipated outdoor air temperature is less than the current air temperature, operate the boiler according to the default set point value,
in instances of anticipated outdoor warming, where the comparison determines that the anticipated outdoor temperature exceeds the current outdoor temperature, determine the reduced set point temperature to assign according to a variable scale under which the magnitude of negative offset applied to the default set point value increases with the magnitude of difference between the current outdoor air temperature and the anticipated outdoor air temperature, and operate the boiler according to the reduced set point temperature determined according to said variable scale,
obtain a boiler temperature from the hydronic boiler direct-to-digital temperature transducer and compare said boiler temperature against the assigned set point temperature to obtain confirmation that said assigned set point temperature is reached and maintained by the boiler, and in the absence of said confirmation, send an alarm signal to the remotely located system control server to trigger an alarm notification therefrom to the one or more internet enabled devices, and
check for communicability of the microcomputer-based controller with one or more of the servers via the internet connection, and in the event of failed communication with said one or more of the servers, reverting a failsafe mode of operation in which the microcomputer-based controller is operable to assign only default set point values, and not any reduced set point values negatively offset therefrom; and
wherein said remotely located system control server is configured to check for communicability thereof with the microcomputer-based controller via the internet connection, and in the event of failed communication therewith, trigger another alarm notification from the remotely located system control server to the one or more internet enabled devices.

10. The hydronic heating system of claim 9, further comprising a plurality of zone temperature sensors that communicate with said microcomputer-based controller.

11. The hydronic heating system of claim 10, wherein said zone temperature sensors define nodes of a mesh network by which said zone temperature sensors communicate with said microcomputer-based controller.

12. The hydronic heating system of claim 10, wherein said zone temperature sensors are configured to measure respective zone temperatures and provide said measured zone temperatures to said microcomputer-based controller, which is configured to adjust the set point temperature of the hydronic boiler based on said current remote zone temperatures.

13. The hydronic heating system of claim 12, wherein the microcomputer-based controller is configured to adjust the set point temperature of the boiler based on the measured remote zone temperatures by determining whether a quantity of remote zone temperature sensors exceeding a zone quantity threshold have respective zone temperatures that vary from a normal zone temperature value by more than a zone temperature variation threshold, and in response to determination that the zone quantity threshold and zone temperature variation threshold are both exceeded, adjust the set-point temperature of the boiler.

14. The hydronic heating system of claim 13 wherein the respective zone temperatures measured by the zone temperature sensors are zone air temperatures.

15. The hydronic heating system of claim 13 wherein the respective zone temperatures measured by the zone temperature sensors are zone heater temperatures.

16. The hydronic heating system of claim 9, further comprising at least one additional hydronic boiler and at least one respective additional microcomputer-based controller respectively connected to said at least one additional boiler.

17. The hydronic heating system of claim 16 wherein the microcomputer-based controller and the at least one additional hydronic boiler are connected through a wireless network.

18. The hydronic heating system of claim 17 wherein the wireless network is a mesh network in which respective nodes are defined the microcomputer-based controller, the at least one additional hydronic boiler, and a plurality of zone temperature sensors that communicate with said microcomputer-based controllers.

19. The system of claim 9 wherein the microcomputer-based controller lacks an onboard display and manual control inputs, and is configured to receive updates, operational settings and/or other administrative communication from the remotely located system control server and/or the one or more internet enabled devices.

20. The system of claim 9 wherein the microcomputer-based controller comprises an interface comprising inputs and outputs used to monitor and control operation of the hydronic boiler, said inputs and outputs being characterized by inclusion of one or more of the following types (a) 0-10 VDC signal; (b) 4-20 mA signal and (c) dry contacts.

21. The system of claim 20 wherein the interface of the microcomputer-based controller comprises a connection to the boiler through which boiler alarm signals are receivable therefrom, said microcomputer-based controller being configured to forward external alarm signals to the remotely located system control server in response to said boiler alarm signals to trigger boiler alarm notifications from said remotely located system control server to said one or more of the internet-enabled devices.

22. The system of claim 9 wherein the microcomputer-based controller is configured to automatically shut off the boiler in the event that either the default set point value or the reduced set point value to be assigned to the boiler is less than a minimum operating temperature of the boiler.

23. A hydronic heating control system comprising a microcomputer-based controller having control outputs operably connectable to a hydronic boiler of a building to control operation thereof, inputs operably connected or connectable to a hydronic boiler direct-to-digital temperature transducer and an outside direct-to-digital temperature transducer, a network connection operably connectable to the internet to communicate with remotely located servers and one or more internet enabled devices, wherein said microcomputer-based controller is configured to:

automatically obtain a current outdoor air temperature from the outside direct-to-digital temperature transducer, automatically obtain weather forecast data, including an anticipated outdoor air temperature, from one or more remotely located meteorological servers via said network connection, automatically perform comparison of the anticipated outdoor air temperature against a current outdoor air temperature obtained from the outside direct-to-digital temperature transducer, and based on said comparison, automatically assign a set point temperature of the hydronic boiler that is either a prescribed default set point value for the current outdoor air temperature if the comparison finds that the anticipated outdoor air temperature does not exceed the current outdoor air temperature, or a reduced set point value negatively offset from said prescribed default set point value if the comparison finds that the anticipated outdoor air temperature exceeds the current outdoor temperature, in instances of anticipated outdoor cooling, where the comparison finds that the anticipated outdoor air temperature is less than the current air temperature, operate the boiler according to the default set point value, in instances of anticipated outdoor warming, where the comparison determines that the anticipated outdoor temperature exceeds the current outdoor temperature, determine the reduced set point temperature to assign according to a variable scale under which the magnitude of negative offset applied to the default set point value increases with the magnitude of difference between the current outdoor air temperature and the anticipated outdoor air temperature, and operate the boiler according to the reduced set point temperature determined according to said variable scale, obtain a temperature of the boiler from the hydronic boiler direct-to-digital temperature transducer and compare said temperature of the boiler against the assigned set point temperature to obtain confirmation that said assigned set point temperature is reached and maintained by the boiler, and in the absence of said confirmation, send an alarm signal to a remotely located system control server through said network connection to trigger an alarm notification to said one or more internet enabled devices, and through said network connection, check for communicability of the microcomputer-based controller with the remotely located system control server via the internet connection, and in the event of failed communication therewith, reverting a failsafe mode of operation in which the microcomputer-based controller is operable to assign only default set point values, and not any reduced set point values negatively offset therefrom.

* * * * *